US012723897B2

(12) United States Patent
Lian et al.

(10) Patent No.: US 12,723,897 B2
(45) Date of Patent: Sep. 1, 2026

(54) PLATFORM THROUGH-BEAM SENSOR DEVICE

(71) Applicant: Brogent Technologies Inc., Kaohsiung City (TW)

(72) Inventors: Guo-Sen Lian, Kaohsiung City (TW); Shao-Hua Tsai, Kaohsiung City (TW); Cheng-Lin Huang, Kaohsiung City (TW); Chih-Huang Wang, Kaohsiung City (TW)

(73) Assignee: BROGENT TECHNOLOGIES INC., Kaohsiung City (TW)

( * ) Notice: Subject to any disclaimer, the term of this patent is extended or adjusted under 35 U.S.C. 154(b) by 488 days.

(21) Appl. No.: 18/238,117

(22) Filed: Aug. 25, 2023

(65) Prior Publication Data

US 2024/0353241 A1 Oct. 24, 2024

(30) Foreign Application Priority Data

Apr. 18, 2023 (TW) ................................ 112114402

(51) Int. Cl.

*G01D 5/30* (2006.01)
*G01D 5/26* (2006.01)
*G01D 5/40* (2006.01)

(52) U.S. Cl.

CPC ............. *G01D 5/305* (2013.01); *G01D 5/264* (2013.01); *G01D 5/40* (2013.01)

(58) Field of Classification Search

CPC ........... G01D 5/305; G01D 5/264; G01D 5/40
See application file for complete search history.

(56) References Cited

U.S. PATENT DOCUMENTS 4,266,124 A * 5/1981 Weber ..................... F16P 3/144
250/221
2016/0043801 A1* 2/2016 Grimm .................... G01V 8/20
398/131

FOREIGN PATENT DOCUMENTS

CN 112097637 A 12/2020
TW 201800719 A 1/2018

OTHER PUBLICATIONS

Taiwanese Search Report for Taiwanese Application No. 112114402, dated May 17, 2024, with an English translation.

* cited by examiner

*Primary Examiner* — Andrew Smyth

(74) *Attorney, Agent, or Firm* — Birch, Stewart, Kolasch & Birch, LLP

(57) ABSTRACT

A platform through-beam sensor device includes a transmitter module and a receiver module. A light emitted by a light-emitting element of the transmitter module is shaped into a light pattern range by a transmitter mask. A range of the light received by a light-receiving element of the receiver module is changed to a receiving range by a receiver mask. When the present invention is used, the transmitter module and the receiver module are respectively installed on two ends of a mechanical apparatus that move relative to each other. After determining a safety range of the relative movement of the two ends, a state that the light-receiving element falls into the light pattern range and the light-emitting element falls into the receiving range is set to be within the safety range. Upon exceeding the safety range, a flying platform is controlled to stop, thereby improving the safety of the flying platform.

19 Claims, 18 Drawing Sheets

282
28
242
B
28
282
281
29
291
241
291
29
281
20
221
222
22

PLATFORM THROUGH-BEAM SENSOR DEVICE

BACKGROUND OF THE INVENTION

Technical Field

The present invention relates generally to a sensor device, and more particularly to a platform through-beam sensor device.

Description of Related Art

A conventional position sensor, such as an infrared sensor that has a transmitter and a receiver for infrared, determines whether the transmitter and the receiver directly face each other or are in a staggered configuration by the receiver sensing a straight beam sent by the transmitter.

As the beam emitted by the transmitter of the conventional position sensor is a straight beam, the conventional position sensor could only determine whether the transmitter and the receiver directly face each other or are in a staggered configuration. Since such sensor could not sense whether two ends of the sensor that are movable relative each other remain within an allowable movement range or exceed the allowable movement range when the allowable movement range is large, the conventional position sensor does not have the function of controlling a moving range or a rotating range of two opposite ends of a mechanical apparatus.

BRIEF SUMMARY OF THE INVENTION

In view of the above, the primary objective of the present invention is to provide a sensor device including a transmitter module that has a light-emitting range and a receiver module that has a light-sensing range different from the light-emitting range, so that when the transmitter module and the receiver module are respectively disposed on two ends of a mechanical apparatus that are movable relative to each other, the sensor device could be adapted to control a moving range and a rotating range of the two ends of the mechanical apparatus.

The present invention provides a platform through-beam sensor device including a transmitter module and a receiver module. The transmitter module has a transmitter base. The transmitter base has a light-emitting element. A direction of the light-emitting element emitting a light is a front of the transmitter module. A transmitter mask adapted to shape a shape of the light entered into different shapes is disposed in front of the light-emitting element, so that the light passing through the transmitter mask forms a light pattern range. The receiver module has a light-receiving element. A range of the light, which is sensed by the light-receiving element, is a receiving range. When the light-receiving element falls into the light pattern range and the light-emitting element falls into the receiving range, the light-receiving element receives the light emitted by the light-emitting element.

The present invention further provides a platform through-beam sensor device including a transmitter module and a receiver module. The transmitter module has a light-emitting element. A range of a light emitted by the light-emitting element is a light pattern range. The receiver module has a receiver base. The receiver base has a light-receiving element. A direction of the light-receiving element sensing the light is a front of the receiver module. A receiver mask adapted to adjust a range of the light entered is disposed in front of the light-receiving element. The light passing through the receiver mask to be sensed by the light-receiving element forms a receiving range. When the light-receiving element falls into the light pattern range and the light-emitting element falls into the receiving range, the light-receiving element receives the light emitted by the light-emitting element.

With the aforementioned design, when the transmitter module and the receiver module are respectively installed on two ends of a mechanical apparatus that move relative to each other, the transmitter mask or the receiver mask could be selectively adjusted or replaced based on the moving range of the relative movement of the two ends, so that the shape of the light passing through the transmitter mask or the range of the light entering the receiver mask could be adjusted, thereby determining the range of the light of the transmitter module (light pattern range) or the range of receiving range of the receiver module. When the light-receiving element falls into the light pattern range and the light-emitting element falls into the receiving range, the two opposite ends of the mechanical apparatus is within the predetermined moving range. When the light-receiving element does not fall into the light pattern range or the light-emitting element does not fall into the receiving range, the relative movement of the two opposite ends of the mechanical apparatus exceed the predetermined moving range. In this way, the two opposite ends of the mechanical apparatus could be controlled to only move within the predetermined moving range, thereby achieving the effect of controlling the moving range and the rotating range of the two opposite ends of the mechanical apparatus.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
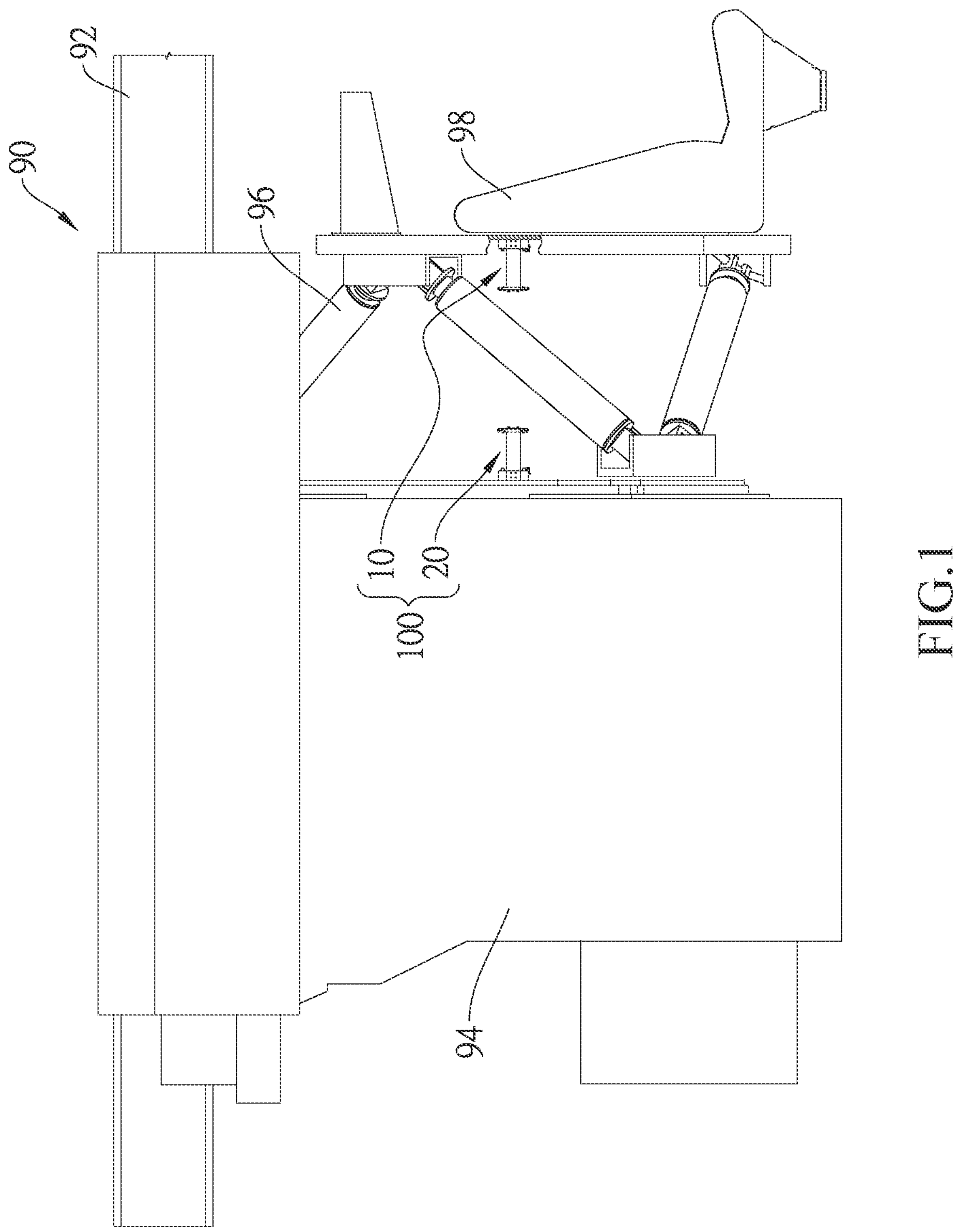
FIG. 1 is a side view of the platform through-beam sensor device according to an embodiment of the present invention installed on the flying platform.
Figure 2:
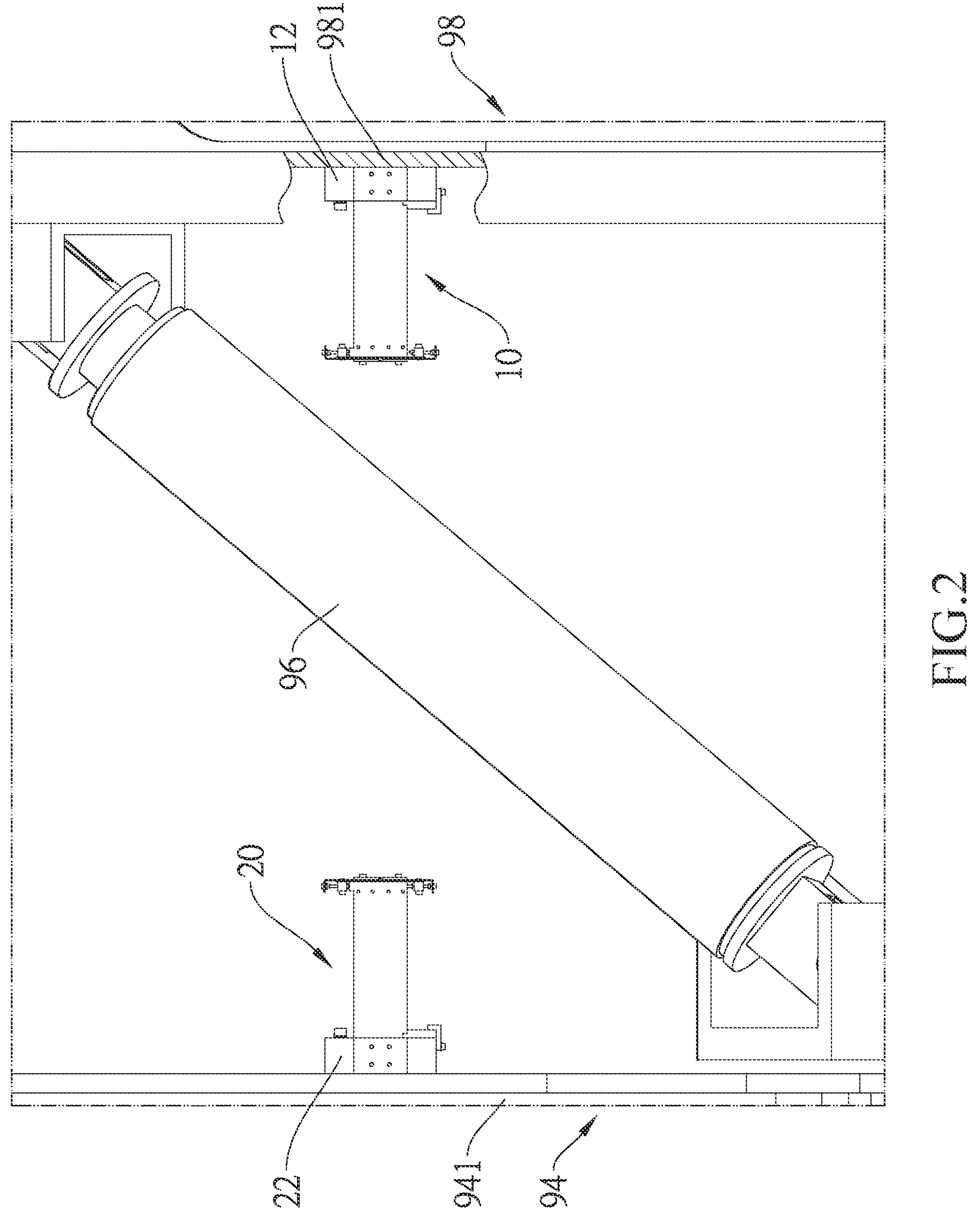
FIG. 2 is a partial enlarged view of FIG. 1, showing the transmitter module and the receiver module according to the embodiment of the present invention.
Figure 3:
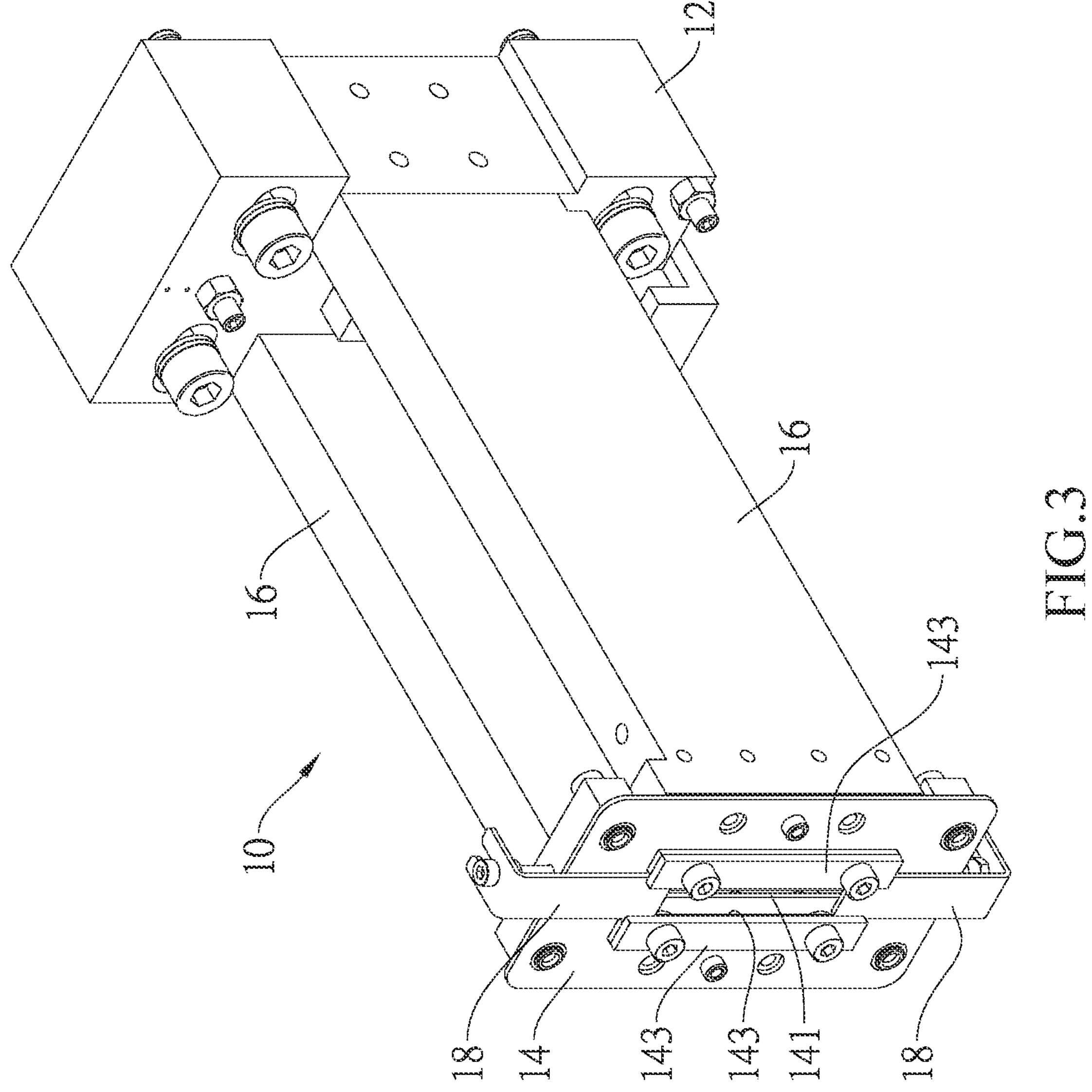
FIG. 3 is a perspective view of the transmitter module according to the embodiment of the present invention.
Figure 4:
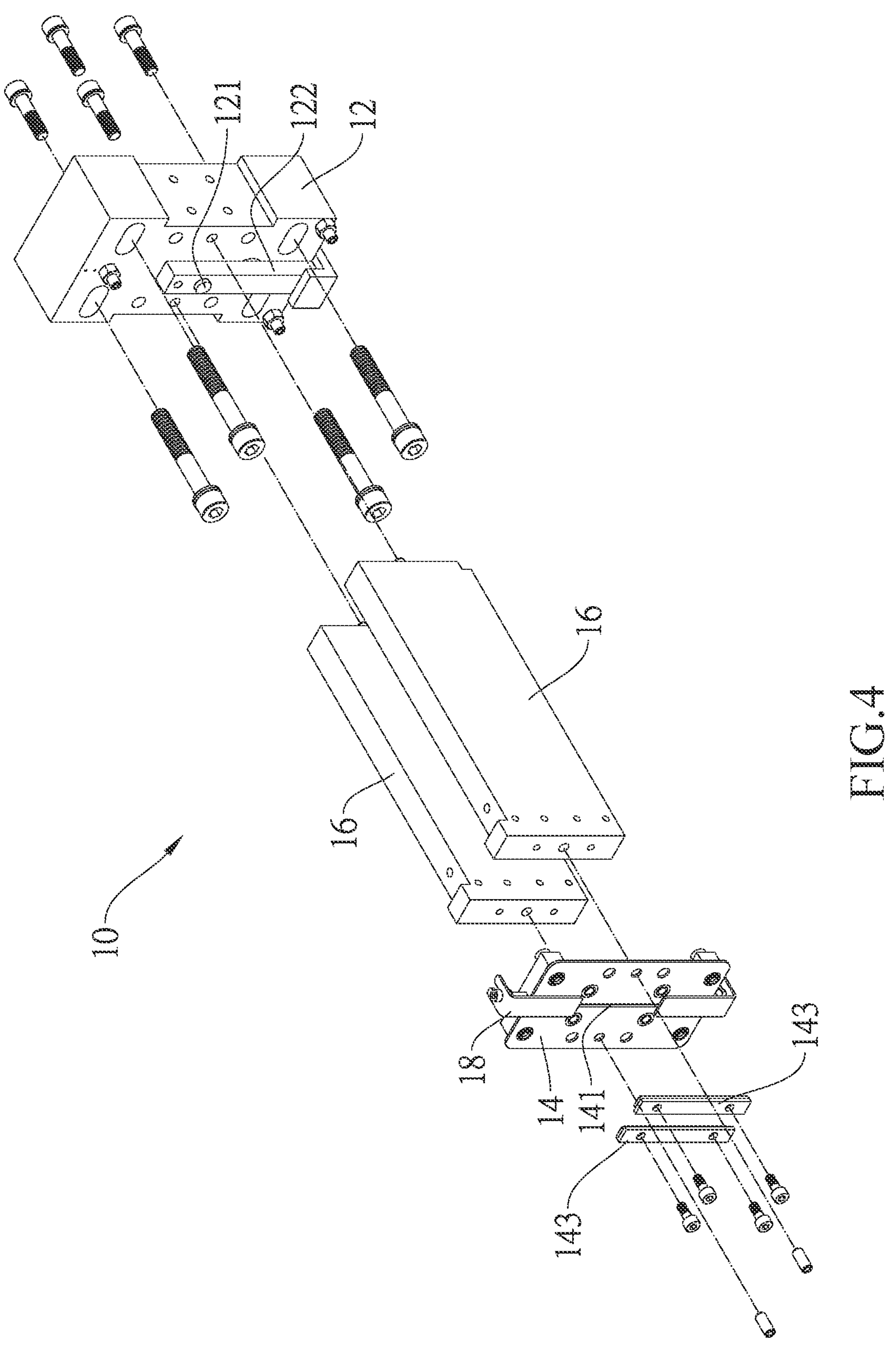
FIG. 4 is an exploded view of the transmitter module in FIG. 3.
Figure 5:
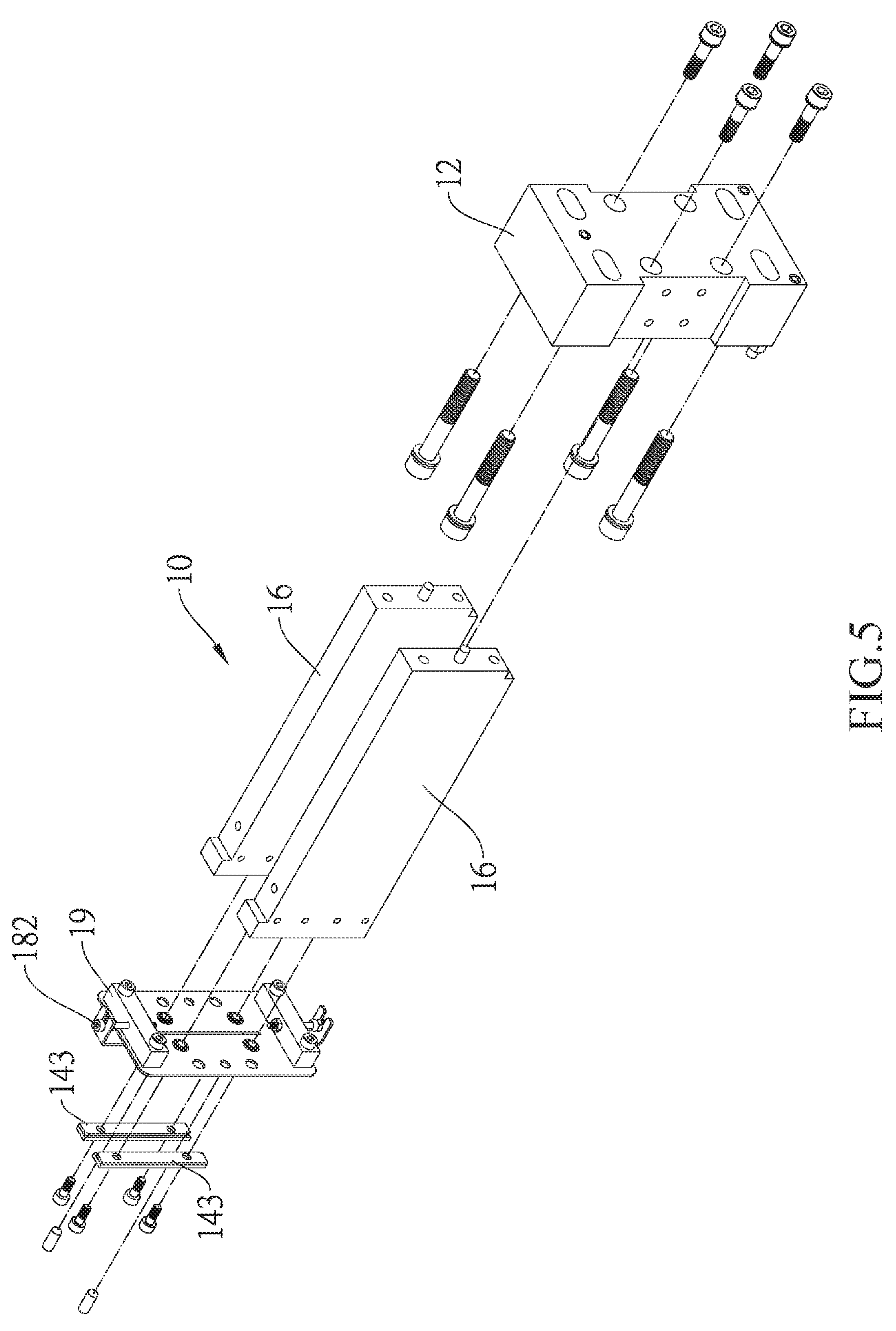
FIG. 5 is an exploded view of the transmitter module in FIG. 3 seen from another direction.
Figure 6:
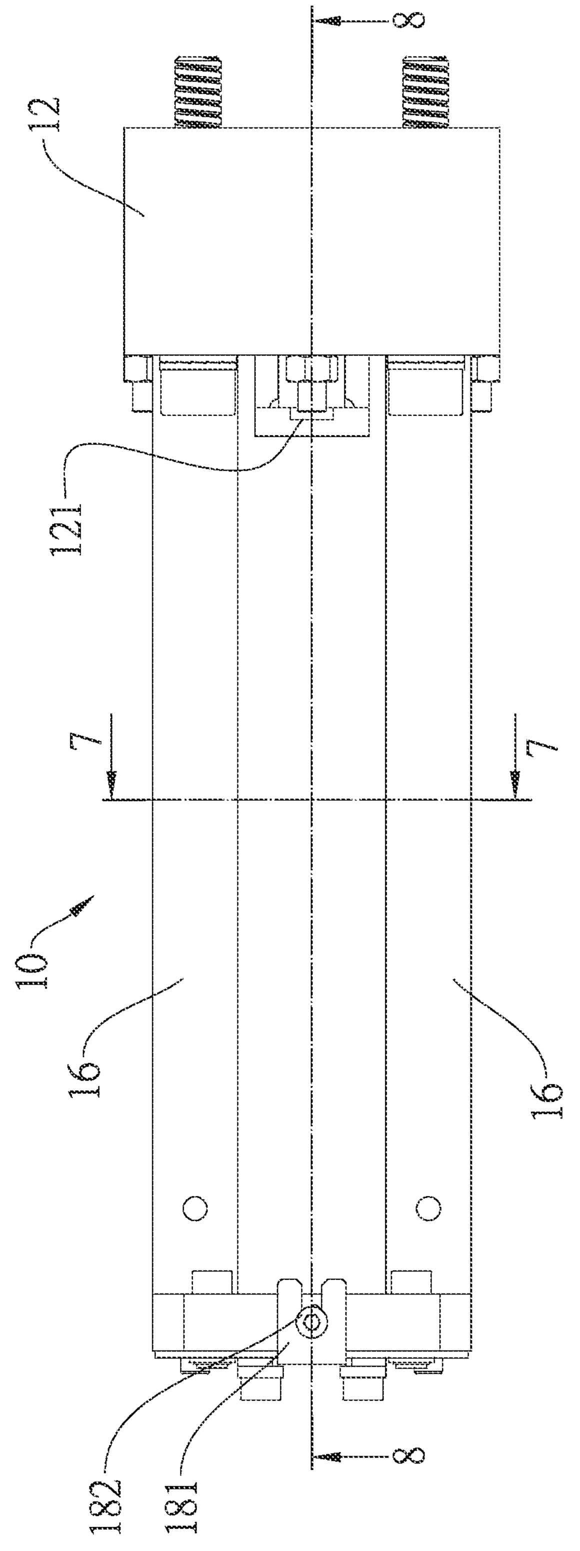
FIG. 6 is a top view of the transmitter module in FIG. 3.
Figure 7:
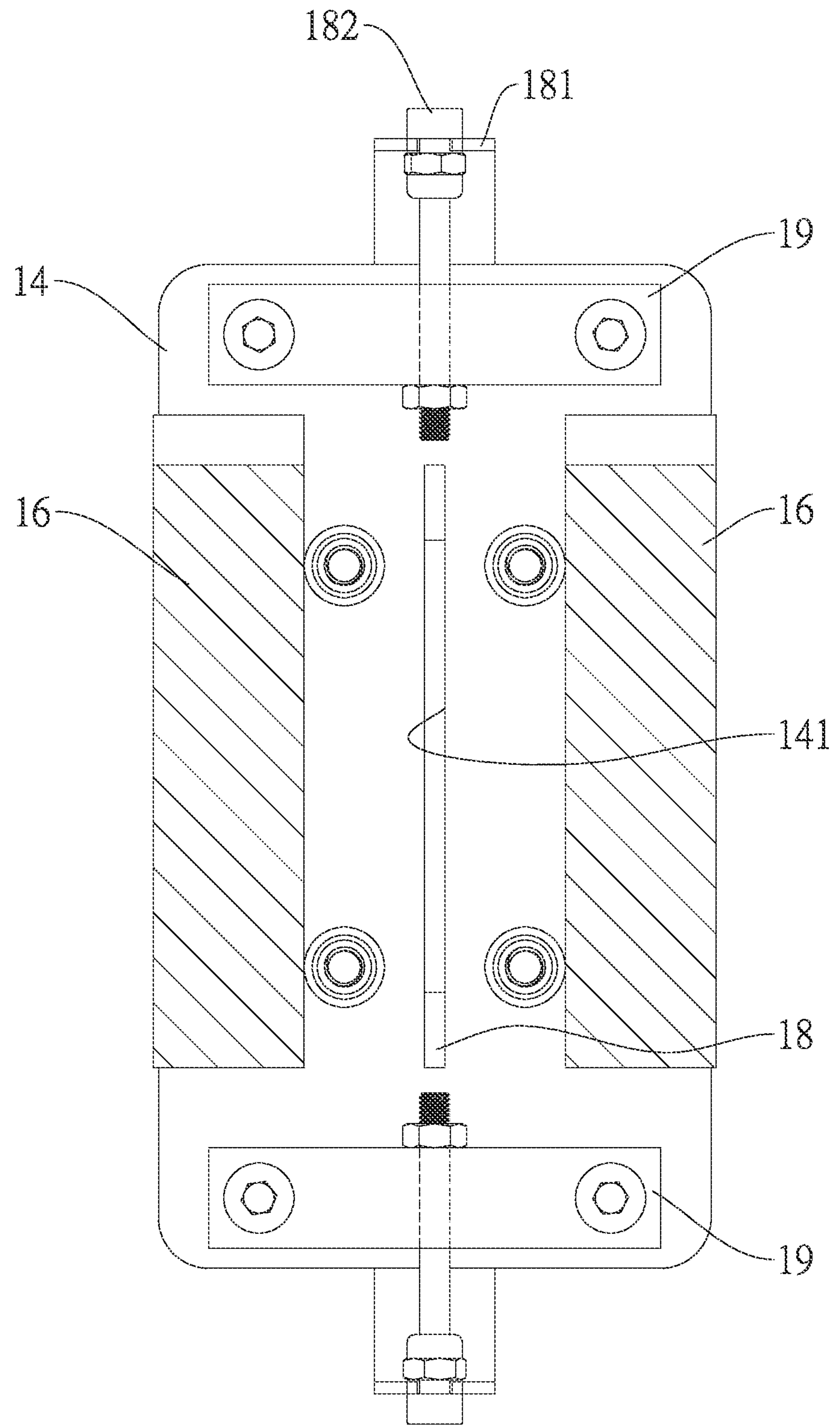
FIG. 7 is a sectional view along the 7-7 line in FIG. 6.

A platform through-beam sensor device 100 according to an embodiment of the present invention is illustrated in FIG. 1 and FIG. 2 and includes a transmitter module 10 and a receiver module 20. The transmitter module 10 is adapted to emit a light, and the receiver module 20 is adapted to sense the light emitted by the transmitter module 10. Through the transmitter module 10 working with the receiver module 20, a state of the transmitter module 10 (i.e., whether the transmitter module 10 falls into a range of the receiver module 20 sensing the light or falls out of the range of the receiver module 20 sensing the light) during a relative movement between the transmitter module 10 and the receiver module 20 and a state of the receiver module 20 (i.e., whether the receiver module 20 falls into a range of the transmitter module 10 emitting the light or falls out of the range of the transmitter module 10 emitting the light) during the relative movement between the transmitter module 10 and the receiver module 20 could be determined.

In the current embodiment, the platform through-beam sensor device 100 is applied to a flying platform 90. The flying platform 90 has a front end, a rear end, and a track 92 extending along a front-rear direction, wherein a base 94 that could be driven to move along the front-rear direction is disposed on the track 92 in a suspended manner and is used as a fixed end 941. A cylinder driving device 96 is disposed on a front side of the base 94, wherein a front end of the cylinder driving device 96 is engaged with a flying chair 98. The flying chair 98 is used as a movable end 981. When the transmitter module 10 and the receiver module 20 in the current embodiment are used, the transmitter module 10 and the receiver module 20 are engaged with the movable end 981 and the fixed end 941 of the flying platform 90, respectively. A front of the transmitter module 10 is a direction of the transmitter module 10 emitting the light, and a front of the receiver module 20 is a direction of the receiver module 20 sensing the light. A front end of the transmitter module 10 faces the receiver module 20, and a front end of the receiver module 20 faces the transmitter module 10, so that the transmitter module 10 and the receiver module 20 are oppositely disposed on the flying platform 90 along the front-rear direction. It is worth mentioning that the platform through-beam sensor device 100 of the present invention is not only suitable for the above-mentioned flying platform 90, but also suitable for any mechanism or device having two ends that are movable relative to each other, so that a safety movement range of the two ends of the mechanism or the device could be predetermined.

As shown in FIG. 2 to FIG. 8, the transmitter module 10 has a transmitter base 12, wherein the transmitter module 10 is engaged with the movable end 981 of the flying platform 90 through the transmitter base 12. A front side of the transmitter base 12 has a light-emitting element 121 adapted to emit infrared light, and the front of the transmitter module 10 is the direction of the light-emitting element 121 emitting the light. A transmitter mask 14 adapted to shape a shape of the light entered into different shapes is disposed in front of the light-emitting element 121. A middle of the transmitter mask 14 has an emission opening 141. The transmitter mask 14 blocks the light emitted forward by the light-emitting element 121 and restricts the light passing through the emission opening 141, thereby forming a light pattern range A. In the current embodiment, the light pattern range A is a range of the shape of the light emitted by the light-emitting element 121 that passes through the emission opening 141 to irradiate outward.

As shown in FIG. 2 and FIG. 9 to FIG. 14, the receiver module 20 has a receiver base 22, wherein the receiver module 20 is engaged with the fixed end 941 of the flying platform 90 through the receiver base 22. A front side of the receiver base 22 has a light-receiving element 221 adapted to sense infrared light. A front of the receiver module 20 is a direction of the light-receiving element 221 sensing the light. A receiver mask 24 adapted to adjust a range of the light entered is disposed in front of the light-receiving element 221. A middle of the receiver mask 24 has a receiving opening 241 adapted to restrict the light entered. The light passing through the receiver mask to be sensed by the light-receiving element 221 forms a receiving range B. The receiving range B is a range of an external light that passes through the receiving opening 241 to be sensed by the light-receiving element 221.

When the light-receiving element 221 falls into the light pattern range A and the light-emitting element 121 falls into the receiving range B, the light-receiving element 221 receives the light emitted by the light-emitting element 121, i.e., when the transmitter module 10 and the receiver module 20 move relative to each other, the transmitter module 10 and the receiver module 20 are still in the range of sensing the light and the range of emitting the light, respectively. Apart from the above-mentioned embodiment, in which the light-emitting element 121 and the light-receiving element 221 are adapted to emit infrared light and to sense infrared light, respectively, the light-emitting element 121 and the light-receiving element 221 in other embodiments could be adapted to respectively emit and sense green light or light with other wavelengths, but not limited thereto.

Referring to FIG. 15 to FIG. 18, in order to prevent the flying chair 98 from colliding with the track 92 above the flying chair 98 or a floor below the flying chair 92 due to the flying chair 98 moving relative to the base 94 before the base 94 moves to a front end of track 92 that there is no floor below the flying chair 98, the flying chair 98 of the flying platform 90 could selectively remain stationary until the base 94 moves to the front end of the track 92. However, in order to improve the somatosensory effect that the flying chair 98 could move relative to the base 94 before being moved to a predetermined position located at the front end of the track 92 without colliding with the track 92 above or the floor below, the transmitter module 10 and the receiver module 20 of the present invention are respectively disposed on the movable end 981 and the fixed end 941 of the flying platform 90, and whether the movement of the flying chair 98 relative to the base 94 is restricted is determined by the state of the transmitter module 10 and the state the receiver module 20, so that the flying chair 98 could move relative to the base 94 without collision before being moved to the predetermined position (for example: before a position that there is no floor below the flying chair 98), thereby fulfilling the safety requirement.

Figure 8:
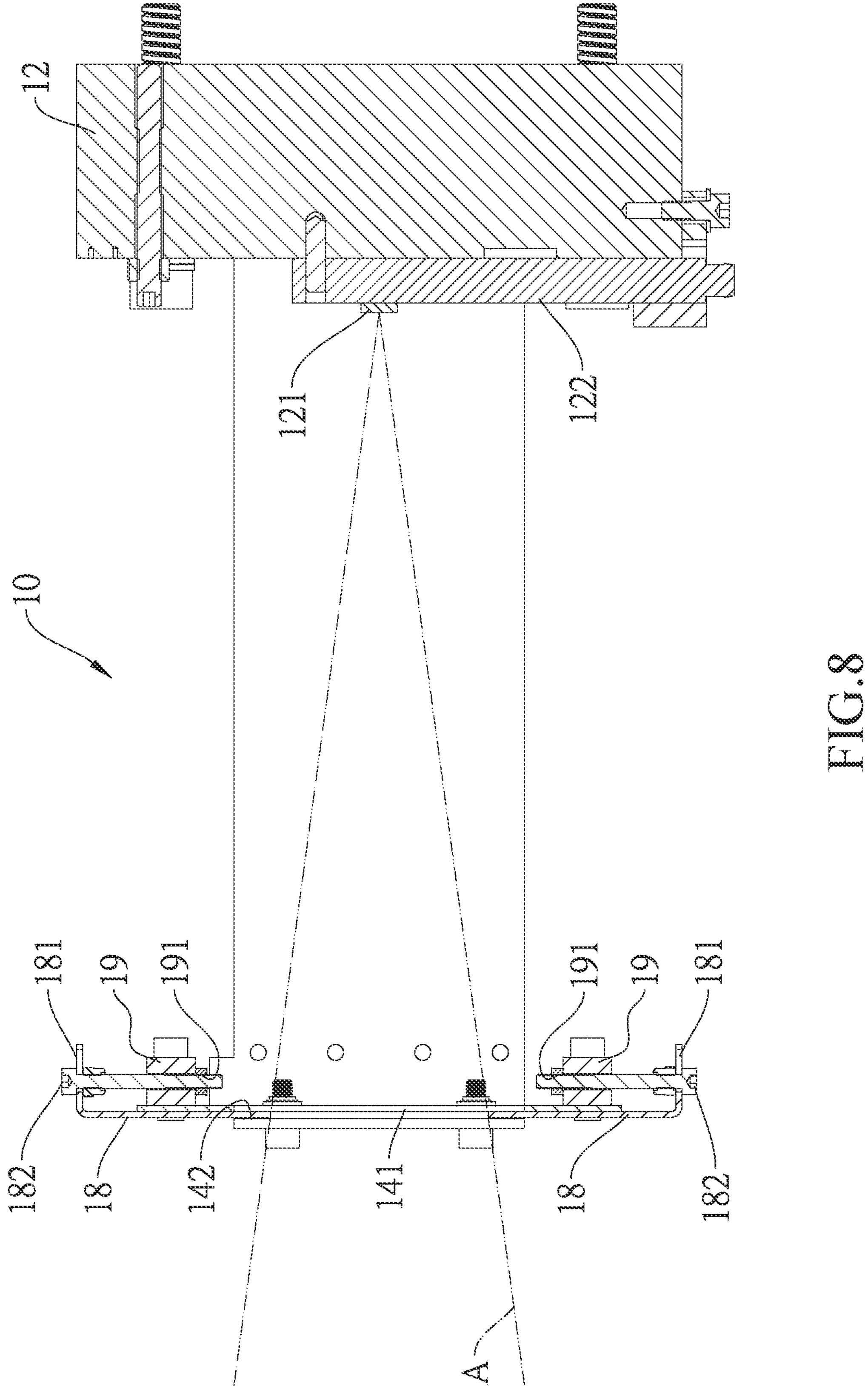
FIG. 8 is a sectional view along the 8-8 line in FIG. 6.
Figure 9:
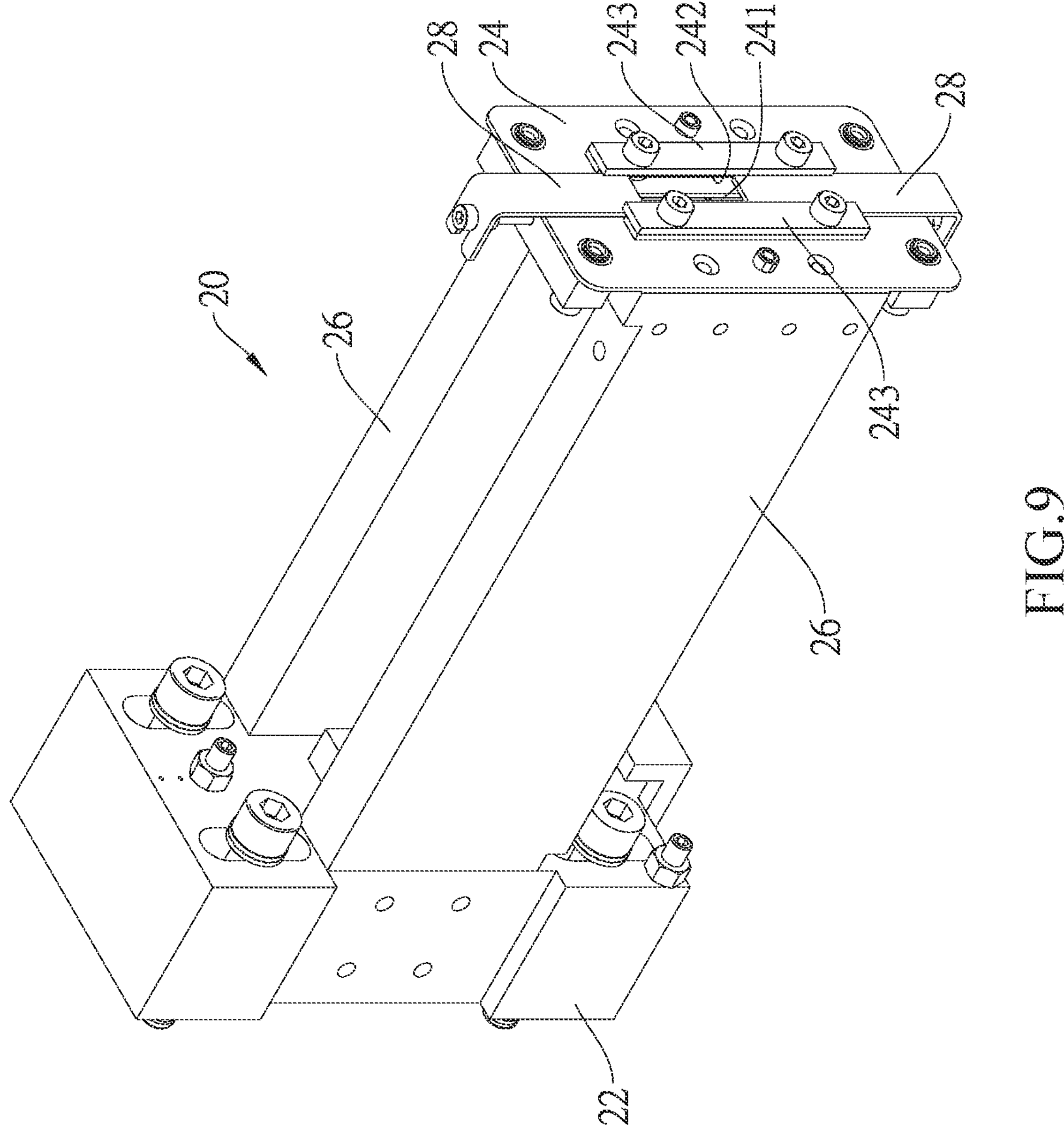
FIG. 9 is a perspective view of the receiver module according to the embodiment of the present invention.
Figure 10:
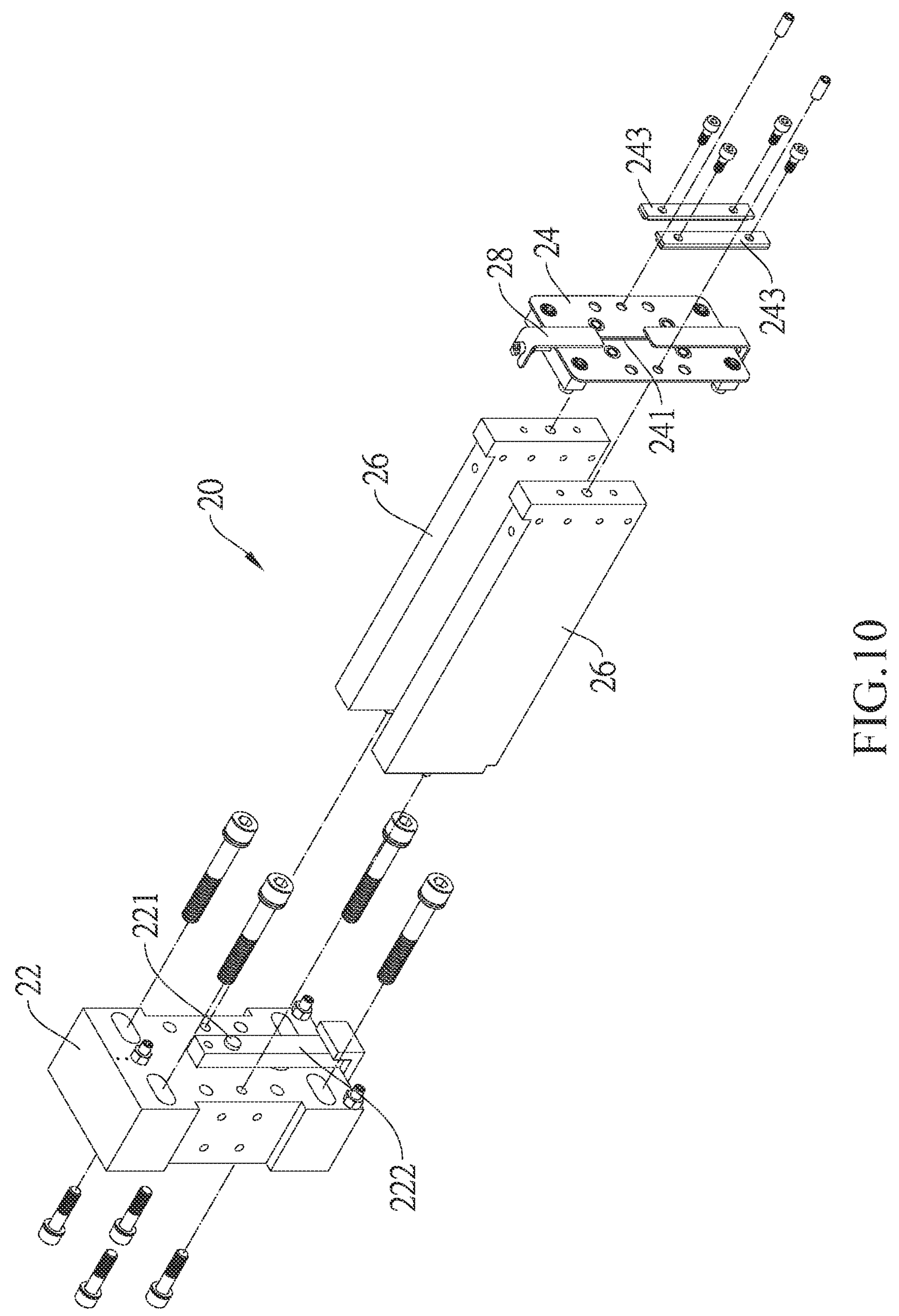
FIG. 10 is an exploded view of the receiver module in FIG. 9.
Figure 11:
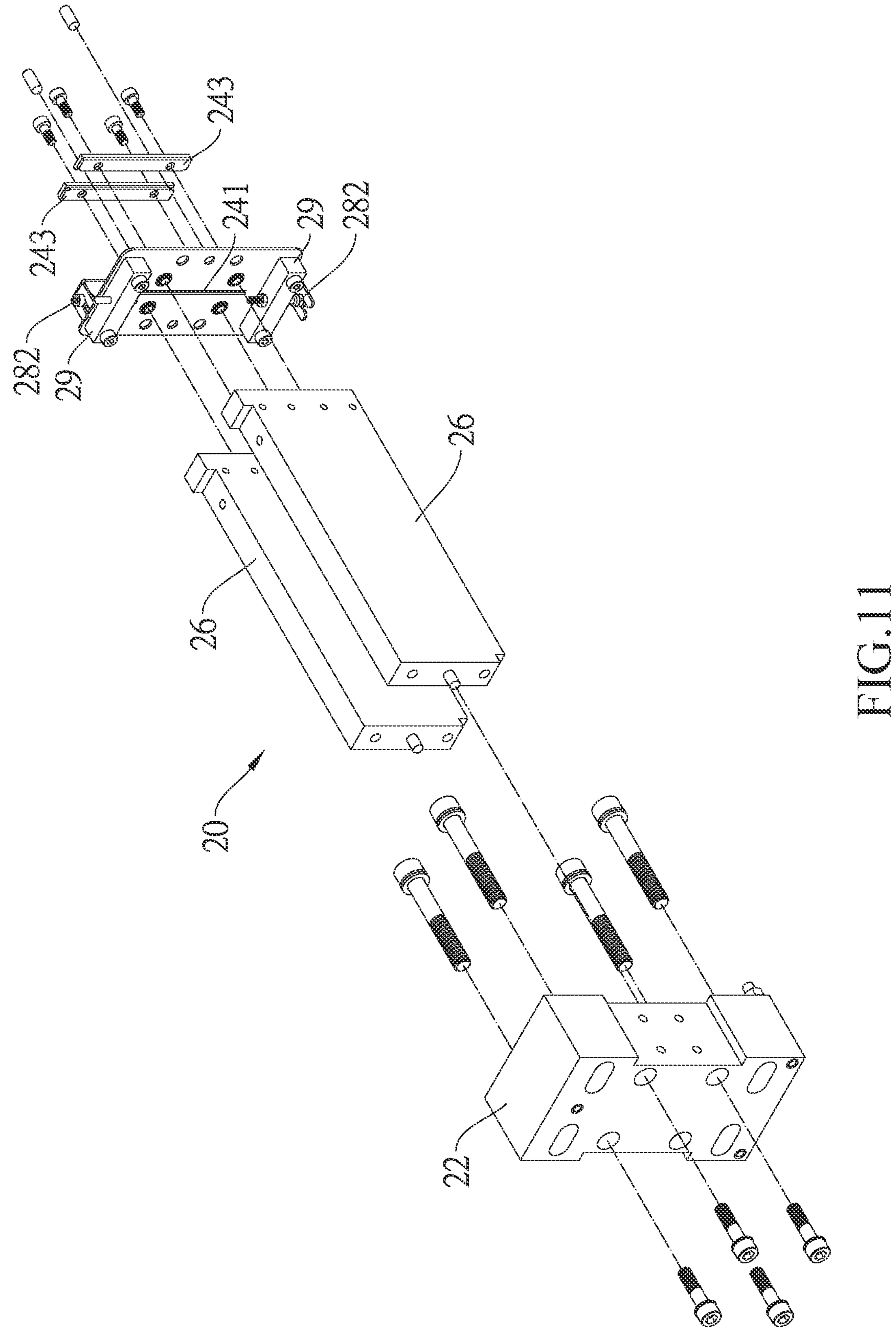
FIG. 11 is an exploded view of the receiver module in FIG. 9 seen from another direction.
Figure 12:
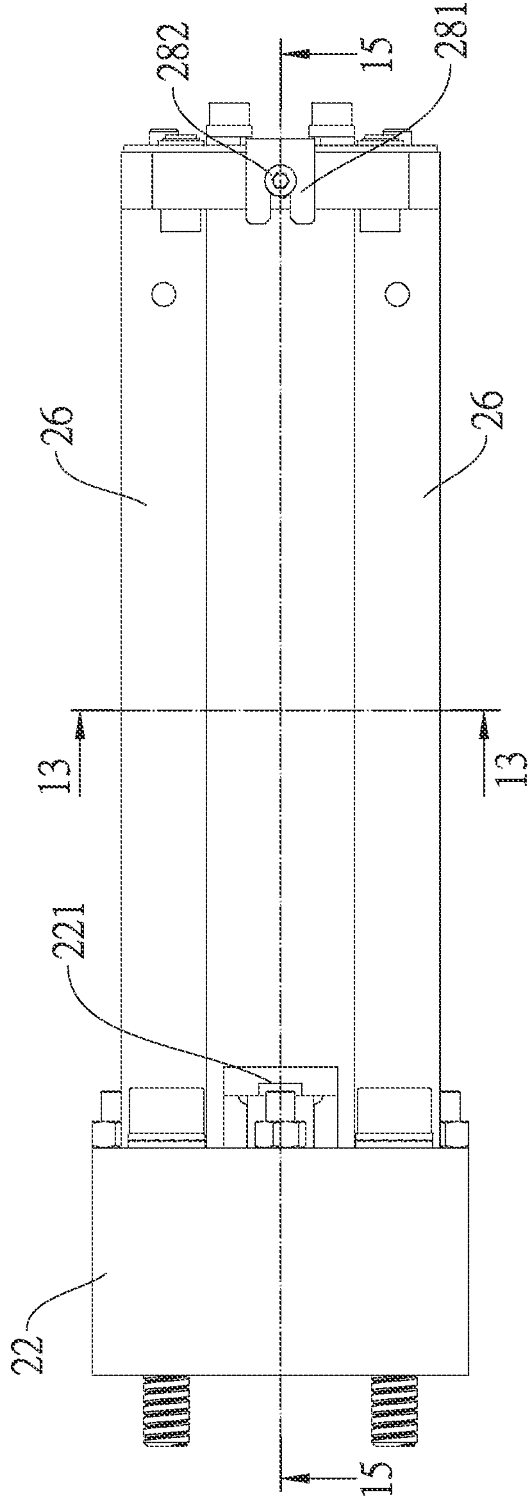
FIG. 12 is a top view of the receiver module in FIG. 9.
Figure 13:
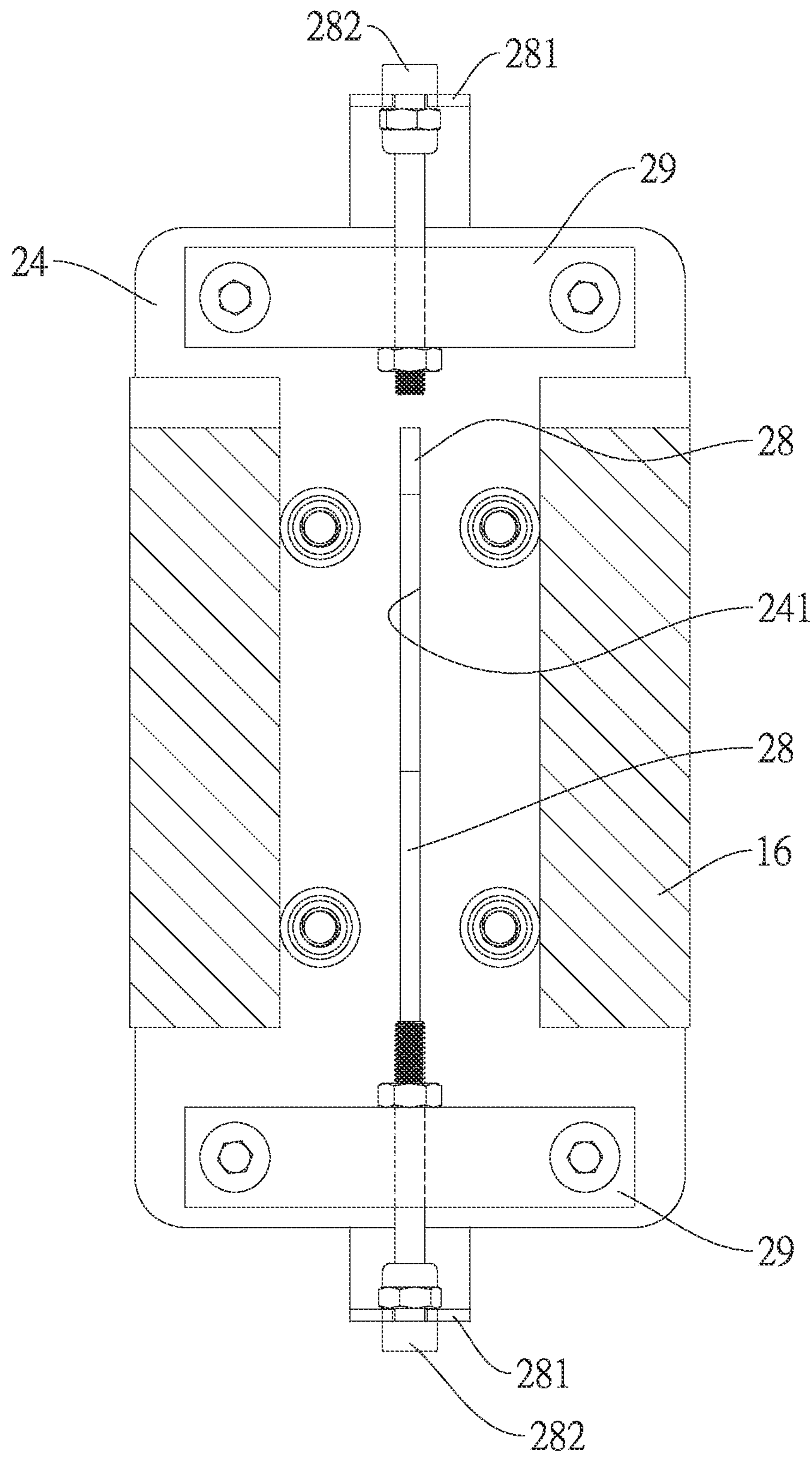
FIG. 13 is a sectional view along the 13-13 line in FIG. 12.
Figure 14:
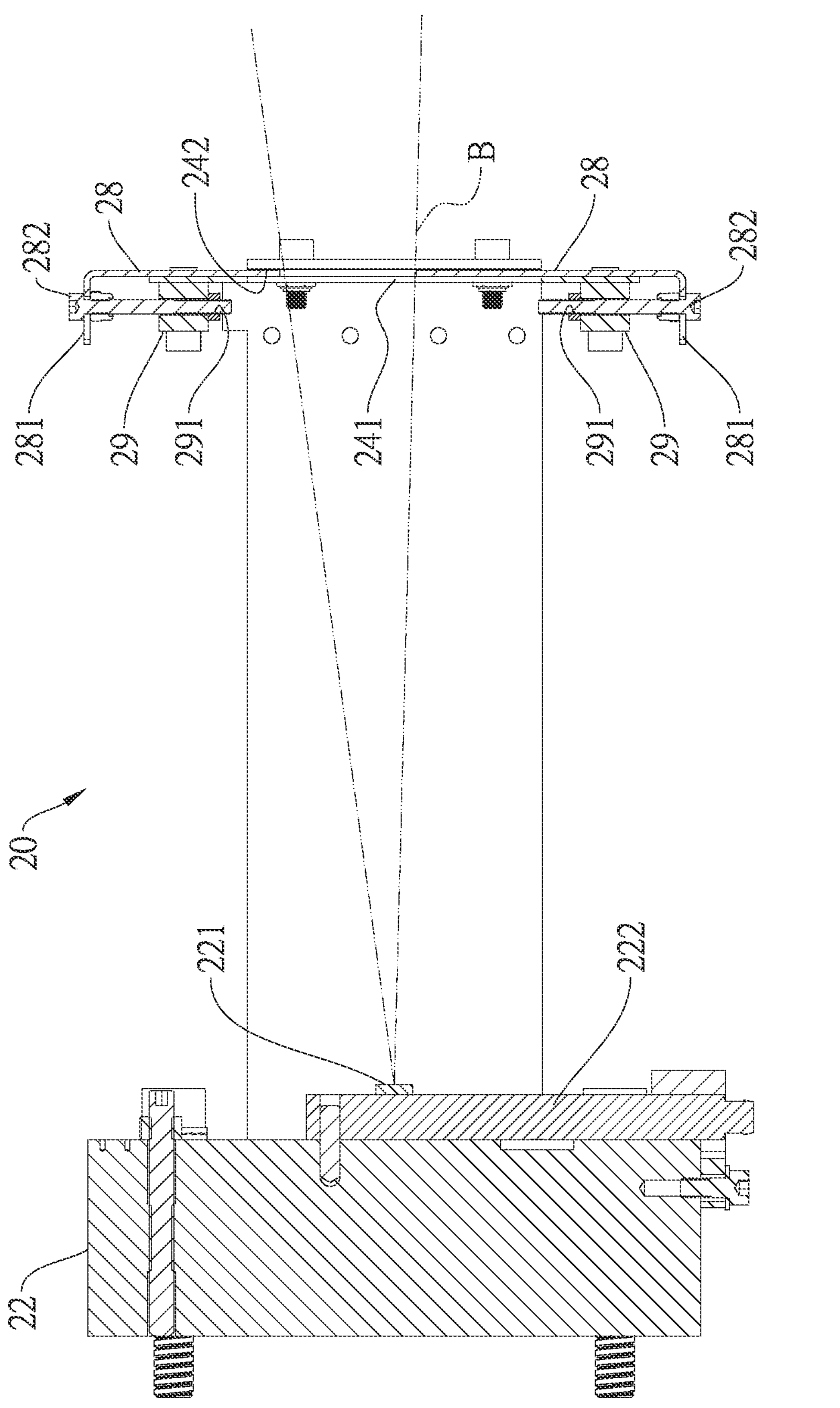
FIG. 14 is a sectional view along the 15-15 line in FIG. 12.

When the platform through-beam sensor device 100 of the embodiment is used, first a safety range of the movable end 981 of the flying chair 98 moving relative to the fixed end 941 of the base 94 is determined, then the requirements of the light pattern range A of the transmitter module 10 and the receiving range B of the receiver module 20 falling into the safety range are simulated, and the emission opening 141 shown in FIG. 8 and the receiving opening 241 shown in FIG. 14 are correspondingly adjusted to an appropriate shape. In this way, when the flying chair 98 moves within the safety range, the light-receiving element 221 falls into the light pattern range A and the light-emitting element 121 falls into the receiving range B, so that the light-receiving element 221 continuously receives the light emitted by the light-emitting element 121. At that time, the platform through-beam sensor device 100 outputs a driving signal. Once the light-receiving element 221 does not receive the light emitted by the light-emitting element 121, which indicates that the flying chair 98 exceeds the safety range while moving relative to the base 94, the platform through-beam sensor device 100 outputs a stop signal to stop the flying platform 90, thereby preventing potential collisions. More specifically, in practice, the stop signal could be a non-signal to stop outputting the driving signal, or a control signal with a specific command to stop the flying platform 90 (such as a brake command to avoid the flying platform 90 from continuing to move due to inertia.

More specifically, in the embodiment, while the flying chair 98 is moved by the base 94 to the predetermined position located at the front end of the track 92, the flying chair 98 could move along a top-bottom direction, or tilt frontward or rearward, which is mainly a planar motion along the front-rear direction and the top-bottom direction. Therefore, in the embodiment, the light-emitting element 121 is a point light source capable of emitting a conical light pattern in a direction toward the receiver module 20 and the emission opening is a strip-shaped slit extending along the top-bottom direction, so that the light pattern range A is in fan shape along the top-bottom direction; an area of the light-receiving element 221 that senses the light is smaller than an area of the receiving opening 241; the receiving opening 241 is a strip-shaped slit extending in the top-bottom direction, so that the receiving range B is also in fan shape. In this way, by the light pattern range A working with the receiving range B, the platform through-beam sensor device 100 is suitable for sensing whether the movable end 981 is within the safety range while moving relative to the fixed end 941 along the top-bottom direction or tilting frontward or rearward.

Figure 15:
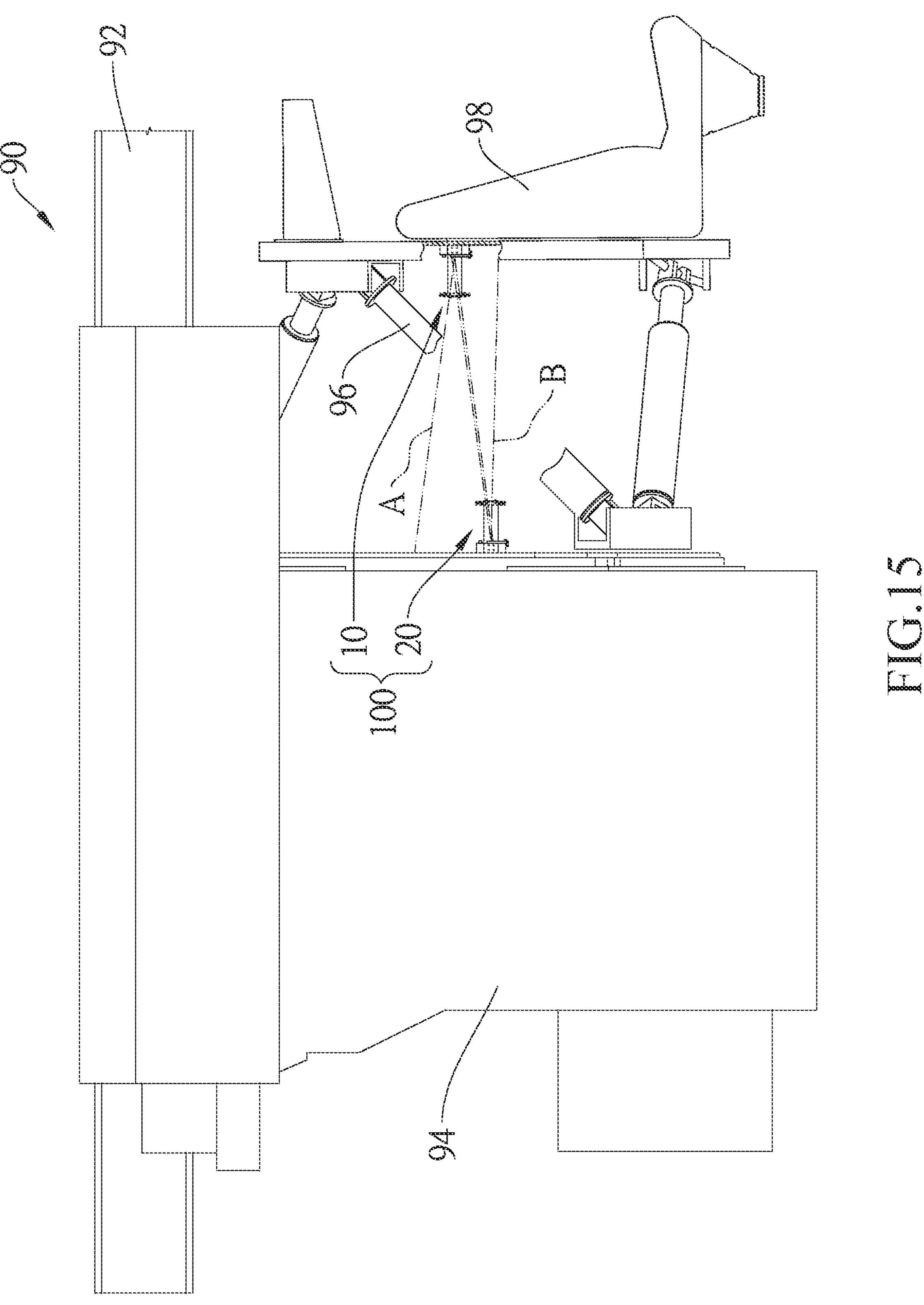
FIG. 15 is a schematic view, showing the flying chair in FIG. 1 being moved to the upper limit of the safety range.
Figure 16:
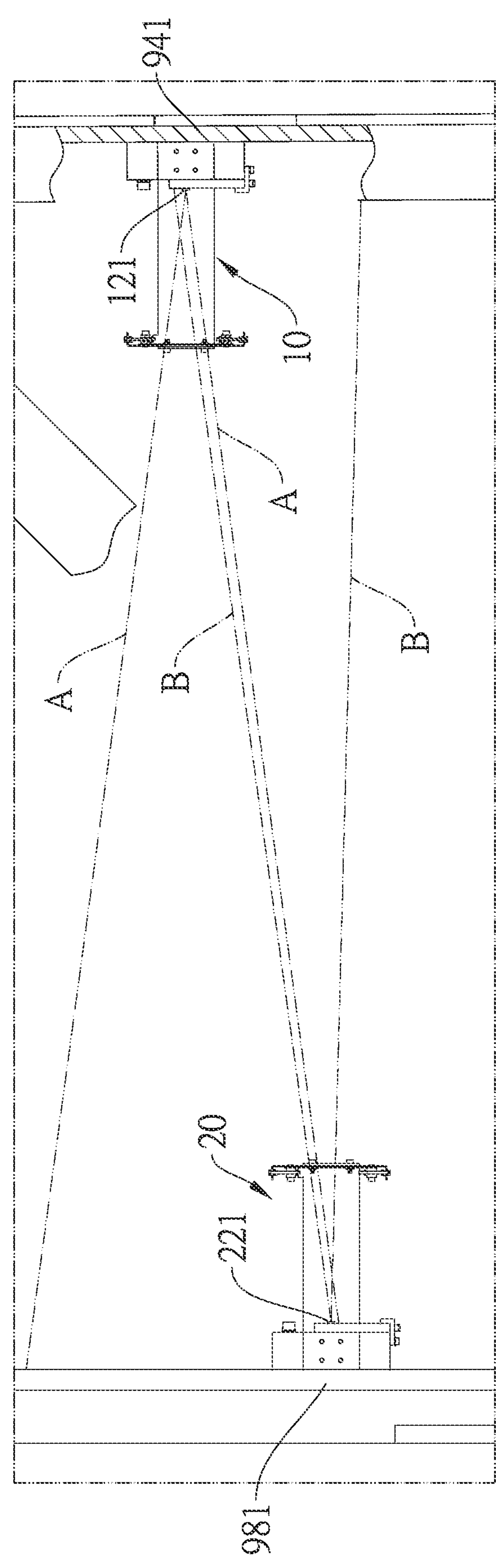
FIG. 16 is a partially enlarged view of FIG. 15, showing the light-receiving element falling into the light pattern range and the light-emitting element falling into the receiving range.
Figure 17:
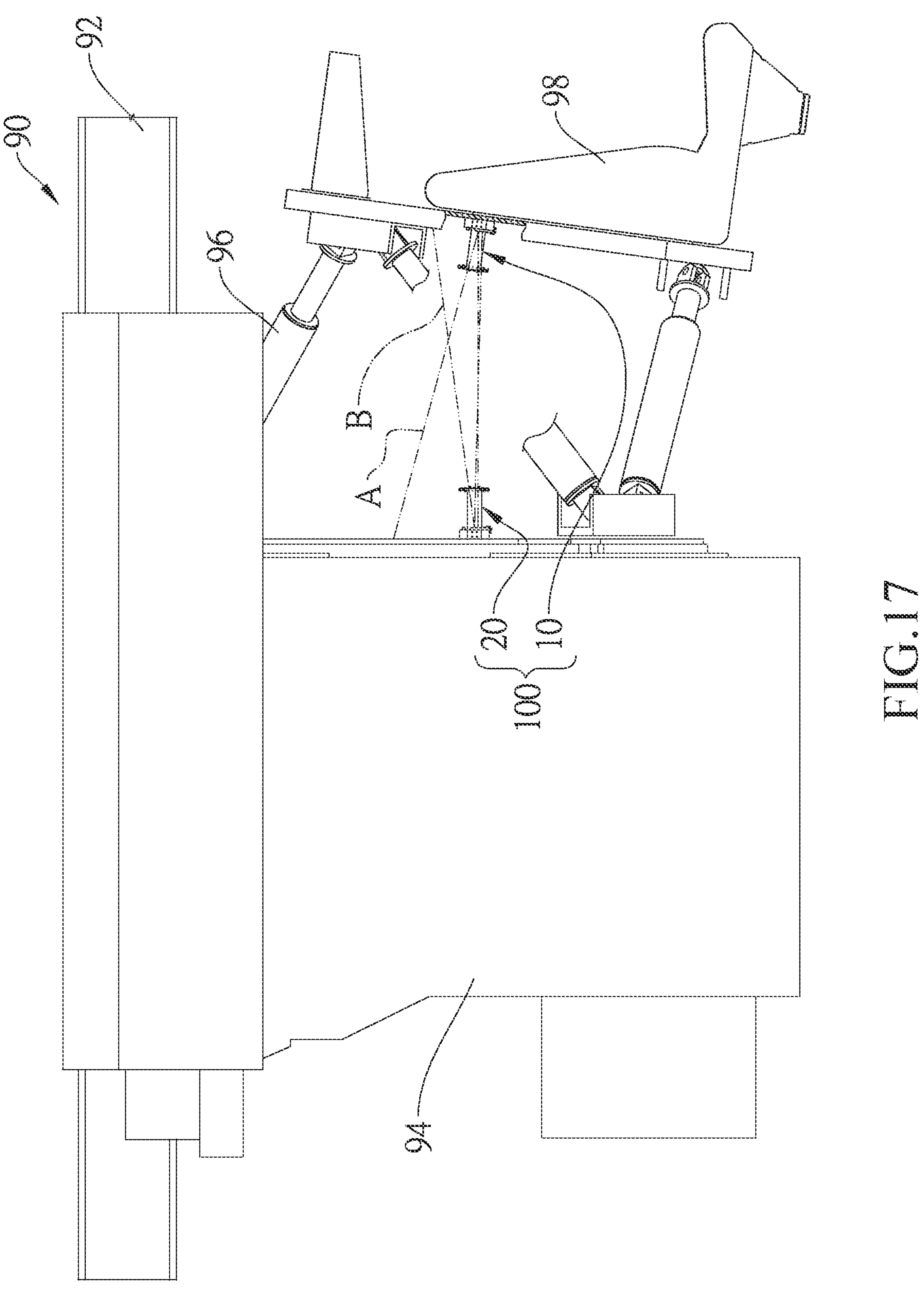
FIG. 17 is a schematic view, showing the flying chair in FIG. 1 being moved to the lower limit of the safety range.
Figure 18:
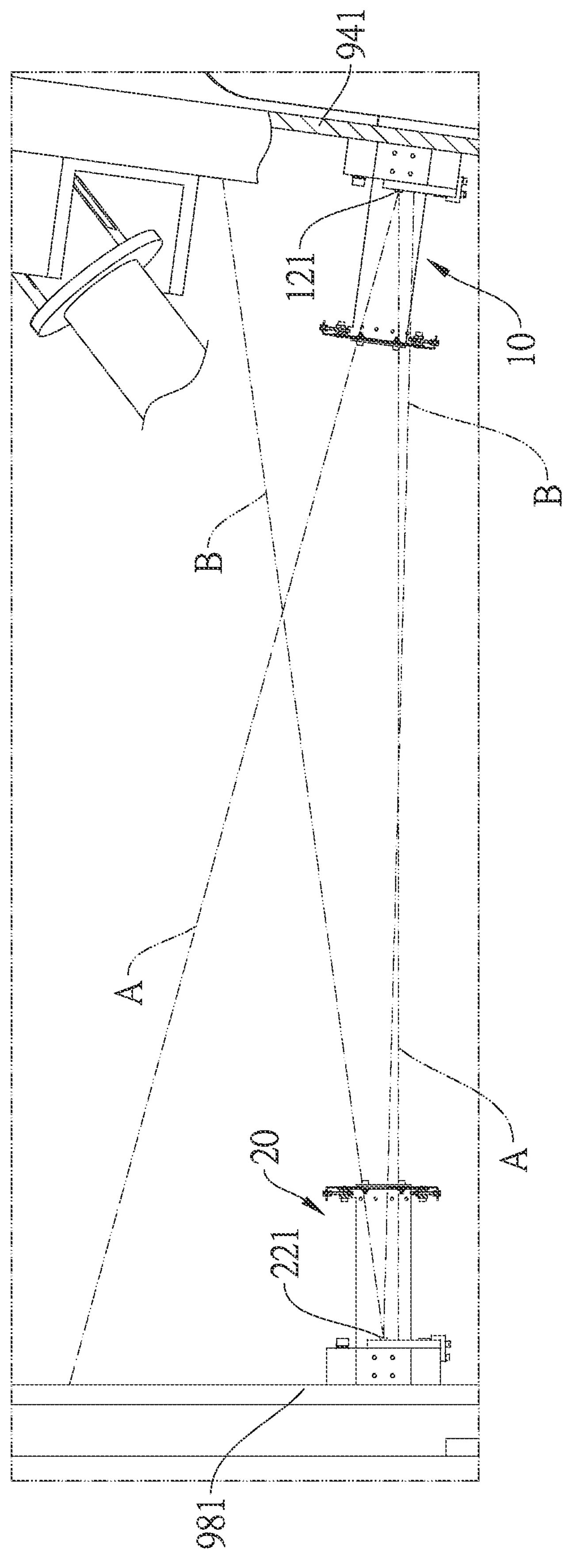
FIG. 18 is a partially enlarged view of FIG. 17, showing the light-receiving element falling into the light pattern range and the light-emitting element falling into the receiving range.

Referring to FIG. 15 and FIG. 16, the flying chair 98 is about to move relative to the base 94 to be at a state of exceeding an upper limit of the safety range. At that time, the light-receiving element 221 still falls into the light pattern range A and the light-emitting element 121 still falls into the receiving range B. However, if the flying chair 98 continues to move upward, the flying chair 98 would exceed the safety range, so that the light-receiving element 221 does not sense the light emitted by the light-emitting element 121, and the stop signal outputted by the platform through-beam sensor device 100 controls the flying platform 90 to stop. Referring to FIG. 17 and FIG. 18, the flying chair 98 is about to move relative to the base 94 to be at a state of exceeding a lower limit of the safety range. At that time, the light-receiving element 221 still falls into the light pattern range A and the light-emitting element 121 still falls into the receiving range B. However, if the flying chair 98 continues to move downward, the flying chair 98 would exceed the safety range, so that the light-receiving element 221 does not sense the light emitted by the light-emitting element 121, and the stop signal outputted by the platform through-beam sensor device 100 controls the flying platform 90 to stop.

In other embodiments, when the platform through-beam sensor device 100 is changed to be used to sense a state of the movable end 981 moving or rotating relative to the fixed end 941 along a left-right direction, the emission opening 141 could be changed to a strip-shaped slit extending in the left-right direction, and the receiving opening 241 could be changed to a strip-shaped slit extending in the left-right direction. In addition, a length of the emission opening 141 and a length of the receiving opening 241 could be adjusted according to a movable range of the fixed end 941 and the movable end 981 (i.e., the safety range).

Moreover, by adjusting the shape of the emission opening 141 and the shape of the receiving opening 241, the safety range could be correspondingly adjusted. For example, the shape of the emission opening 141 and the shape the receiving opening 241 could be changed from strip shape to circular shape or polygonal shape, so that a shape of the light pattern range A and a shape of the receiving range B could be changed to cone shape. In other embodiments, the light pattern range A and the receiving range B of the platform through-beam sensor device 100 are not limited to be in the same shape; one of the light pattern range A and the receiving range B could be a strip-shaped slit, and the other of the light pattern range A and the receiving range B could be in cone shape or other shapes according to the safety range.

Referring to FIG. 3 to FIG. 8, two transmitter side panels 16 extending forward are engaged with a left side and a right side of the transmitter base 12, respectively. The transmitter mask 14 is a rectangular plate and is engaged between a front end of the two emitter side panels 16. The light-emitting element 121 is disposed on a light-emitting element base 122 engaged with a front surface of the transmitter base 12.

A transmitter cover track 142 is formed on the transmitter mask 14. At least one transmitter cover 18 is disposed on the transmitter cover track 142 in a slidable and positionable manner and corresponds to a top side or a bottom side of the emission opening 141. For example, in the current embodiment, two transmitter covers 18 respectively corresponding to the top side and the bottom side of the emission opening 141 are provided, wherein each of the transmitter covers 18 moves along the transmitter cover track 142 to adjust an area of the emission opening 141 being covered by the by the transmitter covers 18, thereby adjusting a size of the light pattern range A. In other embodiments, two transmitter cover tracks 142 could be respectively provided on a top side and a bottom side of the transmitter mask 14 to match with the two transmitter covers 18 on the top side and the bottom side of the transmitter opening 141, so that each of the transmitter covers 18 is disposed on one of the transmitter cover tracks 142 in a slidable and positionable manner, thereby adjusting the area of the emission opening 141 being covered by the transmitter covers 18.

More specifically, two transmitter cover rails 143 are disposed on a left side and a right side of the emission opening 141 of the transmitter mask 14, respectively. The transmitter cover track 142 extending in the top-bottom direction is formed between the two transmitter cover rails 143. Each of the two transmitter covers 18 is a L-shaped plate, wherein a side of each of the transmitter covers 18 is slidably disposed on either a top end or a bottom end of the transmitter cover track 142, and another side of each of the transmitter covers 18 that extends out of the transmitter cover track 142 and the transmitter mask 14 forms an adjusting piece 181. Two first bolts 182 respectively pass through the adjusting piece 181 of one of the two transmitter covers 18. Two first adjusting bases 19 are engaged with a top and a bottom of the transmitter mask 14, respectively. Each of the first adjusting bases 19 has a first screw hole 191. Each of the first bolts 182 is screwed into the first screw hole 191 of one of the two first adjusting bases 19 along the top-bottom direction. By adjusting a depth of each of the first bolts 182 being screwed into the corresponding first screw hole 191, a degree of each of the transmitter covers 18 covering the emission opening 141 along the transmitter cover track 142 could be adjusted, so that the area of the emission opening 141 that allows the light to pass through could be adjusted.

Referring to FIG. 9 to FIG. 14, two receiver side panels 26 extending forward are engaged with a left side and a right side of the receiver base 22, respectively. The receiver mask 24 is a rectangular plate and is engaged between a front end of the two receiver side panels 26. The light-receiving element 221 is disposed on a light-receiving element base 222 engaged with a front surface of the receiver base 22. A receiver cover track 242 is formed on the receiver mask 24. At least one receiver cover 28 is disposed on the receiver cover track 242 in a slidable and positionable manner and corresponds to a top side or a bottom side of the receiving opening 241. For example, in the current embodiment, two receiver covers 28 respectively corresponding to the top side and the bottom side of the receiving opening 241 are provided, wherein each of the receiver covers 28 moves along the receiver cover track 242, so that an area of the receiving opening 241 being covered by the receiver covers 28 is adjusted, thereby adjusting a size of the receiving range B. In other embodiments, two receiver cover tracks 242 could be respectively provided on a top side and a bottom side of the receiver mask 24 to match with the two receiver covers 28 on the top side and the bottom side of the receiving opening 241, so that each of the receiver covers 28 is disposed on one of the receiver cover tracks 242 in a slidable and positionable manner, thereby adjusting the area of the receiving opening 241 being covered.

More specifically, two receiver cover rails 243 are disposed on a left side and a right side of the receiving opening 241 on the receiver mask 24, respectively. The receiver cover track 242 extending in the top-bottom direction is formed between the two receiver cover rails 243. Each of the two receiver covers 28 is a L-shaped plate, wherein a side of each of the receiver covers 28 is slidably disposed on either a top end or a bottom end of the receiver cover track 242, and another side of each of the receiver covers 28 that extends out of the receiver cover track 242 and the receiver mask 24 forms an adjusting piece 281. Two second bolts 282 respectively pass through the adjusting piece 281 of one of the two receiver covers 28. Two second adjusting bases 29 are engaged with a top and a bottom of the receiver mask 24, respectively. Each of the second adjusting bases 29 has a second screw hole 291. Each of the second bolts 282 is screwed into the second screw hole 291 of one of the two second adjusting bases 29 along the top-bottom direction. By adjusting a depth of each of the second bolts 282 being screwed into the corresponding second screw hole 291, a degree of each of the receiver covers 28 covering the receiving opening 241 along the receiver cover track 242 could be adjusted, so that the area of the receiving opening 241 that allows the light to pass through could be adjusted.

In the embodiment of the present invention, the emission opening 141 of the transmitter mask 14 restricts the light passing through the emission opening 141 for forming a light pattern range A, and the receiving opening 241 of the receiver mask 24 restricts the light, which could be sensed by the light-receiving element 221, for forming a receiving range B, so that when the light-receiving element 221 falls into the light pattern range A and the light-emitting element 121 falls into the receiving range B, the light-receiving element 221 receives the light emitted by the light-emitting element 121. In other embodiments, only the receiver module 20 could be provided with or without the receiver mask 24 selectively, or only the transmitter module 10 could be provided with or without the transmitter mask 14 selectively, wherein the transmitter module 10 works with the receiver module 20.

In another embodiment, when only the receiver module 20 is provided without the receiver mask 24, the receiving range B of the receiver module 20 is changed to the range of the light that enters the receiver module 20 to be sensed by the light-receiving element 221; when the transmitter module 10 works with the receiver module 20, the way of sensing the light is the same as that of the embodiment, i.e., when the light-receiving element 221 falls into the light pattern range A and the light-emitting element 121 falls into the receiving range B, the light-receiving element 221 receives the light emitted by the light-emitting element 121.

In still another embodiment, when only the transmitter module 10 is provided without the transmitter mask 14, the light pattern range A of the transmitter module 10 is changed to the range of the light emitted forward by the light-emitting element 121; when the transmitter module 10 works with the receiver module 20, the way of sensing the light is the same as that of the embodiment, i.e., when the light-receiving element 221 falls into the light pattern range A and the light-emitting element 121 falls into the receiving range B, the light-receiving element 221 receives the light emitted by the light-emitting element 121. The another embodiment and the still another embodiment could also achieve the effect of the above-mentioned embodiment of the present invention, i.e., whether the movement of the flying chair 98 is restricted is determined according to the state of the transmitter module 10 emitting the light and the state of the receiver module 20 sensing the light, so that the flying chair 98 could move relative to the base 94 before being moved to the predetermined position without collision.

In the embodiment, the transmitter mask 14 of the transmitter module 10 shapes the shape of the light into the light pattern range A by blocking the light emitted by the light-emitting element 121. However, in other embodiments, the transmitter mask 14 could be changed from the covering structure having the emission opening 141 to a mask with a reflector or a lens, wherein the reflector or the lens is adapted to shape the shape of the light passing through into a suitable light pattern range A. Similarly, in the embodiment, the receiver mask 24 of the receiver module 20 restricts the light that enters the receiver module 20 to be sensed by the light-receiving element 221 for forming the receiving range B. In other embodiments, the receiver mask 24 could be changed from the covering structure having the receiving opening 241 to a mask with a reflector or a lens, wherein the reflector or the lens is adapted to change the range of the light that passes through the receiver mask 24 to enter the receiver module 20, so that the light, which enters the receiver module 20 to be sensed by the light-receiving element 221, forms the receiving range B.

It must be pointed out that the embodiments described above are only some preferred embodiments of the present invention. All equivalent structures which employ the concepts disclosed in this specification and the appended claims should fall within the scope of the present invention.

What is claimed is:

1. A platform through-beam sensor device, comprising:

a transmitter module having a transmitter base, wherein the transmitter base has a light-emitting element; a direction of the light-emitting element emitting a light is a front of the transmitter module; a transmitter mask adapted to shape a shape of the light entered into different shapes is disposed in front of the light-emitting element, so that the light passing through the transmitter mask forms a light pattern range; and a receiver module having a light-receiving element, wherein a range of the light, which is sensed by the light-receiving element, is a receiving range; wherein when the light-receiving element falls into the light pattern range and the light-emitting element falls into the receiving range, the light-receiving element receives the light emitted by the light-emitting element.

2. The platform through-beam sensor device as claimed in claim 1, wherein two transmitter side panels extending forward are engaged with a left side and a right side of the transmitter base, respectively; the transmitter mask is engaged between a front end of the two transmitter side panels; the light-emitting element is disposed on a light-emitting element base; the light-emitting element base is engaged with a front surface of the transmitter base.

3. The platform through-beam sensor device as claimed in claim 1, wherein the transmitter mask has an emission opening; the transmitter mask blocks the light emitted by the light-emitting element and restricts the light passing through the emission opening, thereby forming the light pattern range.

4. The platform through-beam sensor device as claimed in claim 3, wherein the emission opening is a strip-shaped slit extending in a top-bottom direction; the light pattern range is fan-shaped.

5. The platform through-beam sensor device as claimed in claim 3, wherein a transmitter cover track is formed on the transmitter mask; at least one transmitter cover is disposed on the transmitter cover track; the at least one transmitter cover moves along the transmitter cover track to adjust an area of the emission opening being covered by the at least one transmitter cover, thereby adjusting a size of the light pattern range.

6. The platform through-beam sensor device as claimed in claim 5, wherein two transmitter cover rails are disposed on a left side and a right side of the emission opening of the transmitter mask, respectively; the transmitter cover track extending along a top-bottom direction is formed between the two transmitter cover rails; the at least one transmitter cover comprises two transmitter covers; the two transmitter covers are slidably disposed on a top end and a bottom end of the transmitter cover track, respectively; a portion of each of the two transmitter covers extending out of the transmitter cover track forms an adjusting piece; two first bolts respectively pass through the adjusting piece of one of the two transmitter covers; two first adjusting bases are engaged with a top and a bottom of the transmitter mask, respectively; each of the two first adjusting bases has a first screw hole; each of the two first bolts is screwed into the first screw hole of one of the two first adjusting bases in the top-bottom direction.

7. The platform through-beam sensor device as claimed in claim 1, wherein when the light-receiving element receives the light emitted by the light-emitting element, the platform through-beam sensor device outputs a driving signal; when the light-receiving element does not sense the light emitted by the light-emitting element, the platform through-beam sensor device outputs a stop signal.

8. The platform through-beam sensor device as claimed in claim 7, wherein the stop signal is a non-signal or a control signal.

9. The platform through-beam sensor device as claimed in claim 1, wherein the transmitter mask is a reflector or a lens.

10. The platform through-beam sensor device as claimed in claim 1, wherein a direction of the light-receiving element sensing the light is a front of the receiver module; a receiver mask adapted to adjust a range of the light entered is disposed in front of the light-receiving element; the light passing through the receiver mask to be sensed by the light-receiving element forms the receiving range.

11. A platform through-beam sensor device, comprising:

a transmitter module having a light-emitting element;

a range of a light emitted by the light-emitting element is a light pattern range; and a receiver module having a receiver base, wherein the receiver base has a light-receiving element;

a direction of the light-receiving element sensing the light is a front of the receiver module;

a receiver mask adapted to adjust a range of the light entered is disposed in front of the light-receiving element;

the light passing through the receiver mask to be sensed by the light-receiving element forms a receiving range;

wherein when the light-receiving element falls into the light pattern range and the light-emitting element falls into the receiving range, the light-receiving element receives the light emitted by the light-emitting element; and wherein the receiver mask is adapted to shape a shape of the light entered into different shapes.

12. The platform through-beam sensor device as claimed in claim 11, wherein two receiver side panels extending forward are engaged with a left side and a right side of the receiver base, respectively; the receiver mask is engaged between a front end of the two receiver side panels; the light-receiving element is disposed on a light-receiving element base; the light-receiving element base is engaged with a front surface of the receiver base.

13. The platform through-beam sensor device as claimed in claim 11, wherein the receiver mask has a receiving opening restricting the light, which is sensed by the light-receiving element, thereby forming the receiving range.

14. The platform through-beam sensor device as claimed in claim 13, wherein the receiving opening is a strip-shaped slit extending in a top-bottom direction; the receiving range is fan-shaped.

15. The platform through-beam sensor device as claimed in claim 13, wherein a receiver cover track is formed on the receiver mask; at least one receiver cover is disposed on the receiver cover track; the at least one receiver cover moves along the receiver cover track to adjust an area of the receiving opening being covered by the at least one receiver cover, thereby adjusting a size of the receiving range.

16. The platform through-beam sensor device as claimed in claim 15, wherein two receiver cover rails are disposed on a left side and a right side of the receiving opening of the receiver mask, respectively; the receiver cover track extending along a top-bottom direction is formed between the two receiver cover rails; the at least one receiver cover comprises two receiver covers; the two receiver covers are slidably disposed on a top end and a bottom end of the receiver cover track, respectively; a portion of each of the two receiver covers extending out of the receiver cover track forms an adjusting piece; two second bolts respectively pass through the adjusting piece of one of the two receiver covers; two second adjusting bases are engaged with a top and a bottom of the receiver mask, respectively; each of the two second adjusting bases has a second screw hole; each of the two second bolts is screwed into the second screw hole of one of the two second adjusting bases along the top-bottom direction.

17. The platform through-beam sensor device as claimed in claim 11, wherein when the light-receiving element receives the light emitted by the light-emitting element, the platform through-beam sensor device outputs a driving signal; when the light-receiving element does not sense the light emitted by the light-emitting element, the platform through-beam sensor device outputs a stop signal.

18. The platform through-beam sensor device as claimed in claim 17, wherein the stop signal is a non-signal or a control signal.

19. The platform through-beam sensor device as claimed in claim 11, wherein the receiver mask is a reflector or a lens.

* * * * *